United States Patent [19]

Acosta

[11] Patent Number: 4,992,027
[45] Date of Patent: Feb. 12, 1991

[54] HYDRAULIC CONTROL VALVE FOR FUEL PUMPING SYSTEM

[75] Inventor: Allan J. Acosta, Seal Beach, Calif.

[73] Assignee: Able Corporation, Yorba Linda, Calif.

[21] Appl. No.: 363,482

[22] Filed: Jun. 8, 1989

[51] Int. Cl.$^5$ ............................................. F04B 49/00
[52] U.S. Cl. ........................................ 417/47; 251/63
[58] Field of Search ................... 251/63; 137/513.5; 417/47

[56] References Cited

U.S. PATENT DOCUMENTS

| | | | |
|---|---|---|---|
| 2,694,979 | 11/1954 | Lauck | 417/47 |
| 2,752,858 | 7/1956 | Berges | 417/47 |
| 4,040,600 | 8/1977 | Coppola et al. | 251/63 |
| 4,138,202 | 2/1979 | Eller | 417/47 |
| 4,639,196 | 1/1987 | Kirkland, Jr. | 251/63 |
| 4,694,730 | 9/1987 | Krieger et al. | 251/63 |
| 4,811,756 | 3/1989 | Hall | 137/513.5 |

Primary Examiner—Leonard E. Smith
Assistant Examiner—Eugene L. Szczecina, Jr.
Attorney, Agent, or Firm—William W. Haefliger

[57] ABSTRACT

A low pressure drop valve connectible to a source of pressurized hydraulic fluid for modulating hydraulic fluid flow is provided; it includes a valve body defining an axially extending tapered bore and having hydraulic flow inlet and outlet ports, a plug valve movable axially in that bore and having an externally tapered surface facing the tapered bore and movable axially relative thereto to increase or decrease a gap formed between the tapered surface and the tapered bore, for controlling the flow of hydraulic fluid via the gap and at least one of said ports, and apparatus responsive to a side stream of pressurized hydraulic fluid to control axial movement of the plug valve in the tapered bore, including first and second pistons connected with the plug valve to move axially therewith, the valve body forming first and second cylinders respectively receiving the pistons for application of hydraulic fluid pressure to the pistons for displacing the pistons and plug valve axially, and protective O-rings in the cylinders acting to space the pistons from bores formed by the cylinders.

16 Claims, 3 Drawing Sheets

HYDRAULIC CONTROL VALVE FOR FUEL PUMPING SYSTEM

BACKGROUND OF THE INVENTION

This invention relates to flow modulating valves for controlling pressurized hydraulic fluid flow to hydraulic motors, and more particularly to such valves as used in systems for driving pumps, such as liquid fuel pumps of centrifugal design.

There is need in such systems, and other systems, for valves of simple, rugged design, and wherein metal-to-metal engagement of valve elements is minimized or eliminated. Conventional spool valves do not serve these purposes in the simple, efficient manner now enabled by the present valve. Typically, such prior valves are cylindrical lapped and honed spool and sleeve assemblies wherein close tolerance end pieces control the flow by changing the flow through a radial hole. The exposed area of the hole is a function of the axial position of the sleeve. These devices require very close fitted parts (on the order of 50 millionths of an inch) and cannot control a large flow without a significant pressure drop, say on the order of 500 to 1000 psi for 25 gpm.

There is also need for improved centrifugal pumps driven by hydraulic motors, as for example are controlled by such flow modulating valves for use in fuel pumping systems.

SUMMARY OF THE INVENTION

It is a major object of the invention to meet the above needs, through provision of a unique, alwaysleaking valve of highly advantageous construction and operation. The tapered spool construction is provided which is very simple to construct (there are no ground or lapped surfaces) and at 25 gpm, the pressure drop is on the order of 75 to 80 psi, for example.

Basically, the hydraulic fluid flow modulating valve meeting the above need comprises:

(a) valve body means defining an axially extending tapered bore and having hydraulic flow inlet and outlet ports, (b) a plug valve movable axially in that bore and having an externally tapered surface facing the tapered bore and movable axially relatively thereto to increase or decrease a gap formed between the tapered surface and the tapered bore, for controlling the flow of hydraulic fluid via the gap and at least one of said ports.

As will be seen, a means is provided to control axial movement of the plug valve and includes first and second pistons connected with the plug valve to move axially therewith, the valve body means forming first and second cylinders respectively receiving the pistons for application of hydraulic fluid pressure to the pistons for displacing the pistons and plug valve axially; and protective O-rings are provided in the cylinders acting to space the pistons from bores formed by the cylinders. The first and second pistons are advantageously located endwise axially oppositely of the tapered plug valve; and stop means is provided in the valve body to limit axial movement of the plug valve so as to prevent closing of the gap.

It is a further object of the invention to provide highly advantageous and unique centrifugal pump structure, as will be seen.

These and other objects and advantages of the invention, as well as the details of a illustrative embodiment, will be more fully understood from the following specification and drawings, in which:

DRAWING DESCRIPTION

DETAILED DESCRIPTION

While the invention is primarily directed to the improved valve, it is described in relation to a system application that includes a fuel pump.

Figure 1:
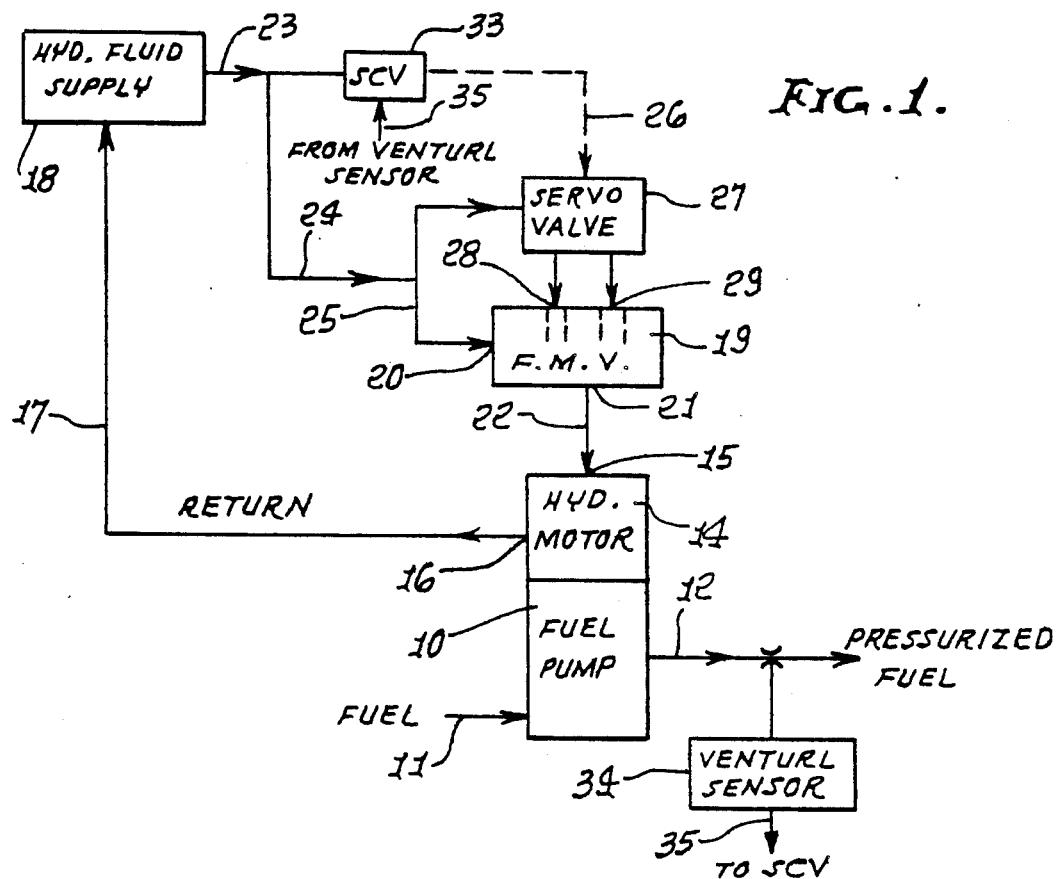
FIG. 1 is a system diagram.

In FIG. 1, a fuel pump 10 receives input fuel flow at 11, and discharges fuel at 12, a typical application being a pump for jet engine fuel, i.e., JP4. It is intended that the pressure of the fuel discharged by the pump in line 13 be kept constant, or substantially constant.

The centrifugal-type pump is driven in rotation as by hydraulic motor 14, having pressurized hydraulic fluid intake 15, and discharge 16 to flow at 17 to supply 18. The motor 14 may be conventional. Supply fluid modulating valve 19 has an intake at 20 and a discharge 21 connected at 22 to the motor intake 15. Lines 23-25 from supply 18 deliver hydraulic fluid to the valve. Fluid from the supply may be pressurized by a pump incorporated in the supply. A side stream of pressurized fluid from the supply is connected at 26 to a servo valve 27 operating to connect fluid under pressure to one or the other of the pressure chambers 28 and 29 in the interior of the modulating valve 19, to control its operation in such manner as to drive the hydraulic motor for the pump so as to maintain the fuel pressure constant. In this regard, the servo valve 27 is conventional, and is controlled by a servo control unit (SCU) 33 connected as shown. Unit 33 receives input from a pressure sensor 34 (venturi type) connected to sense fuel pressure at 12, and to transmit corresponding electrical signals at 35 to the SCU 33.

Figure 3:
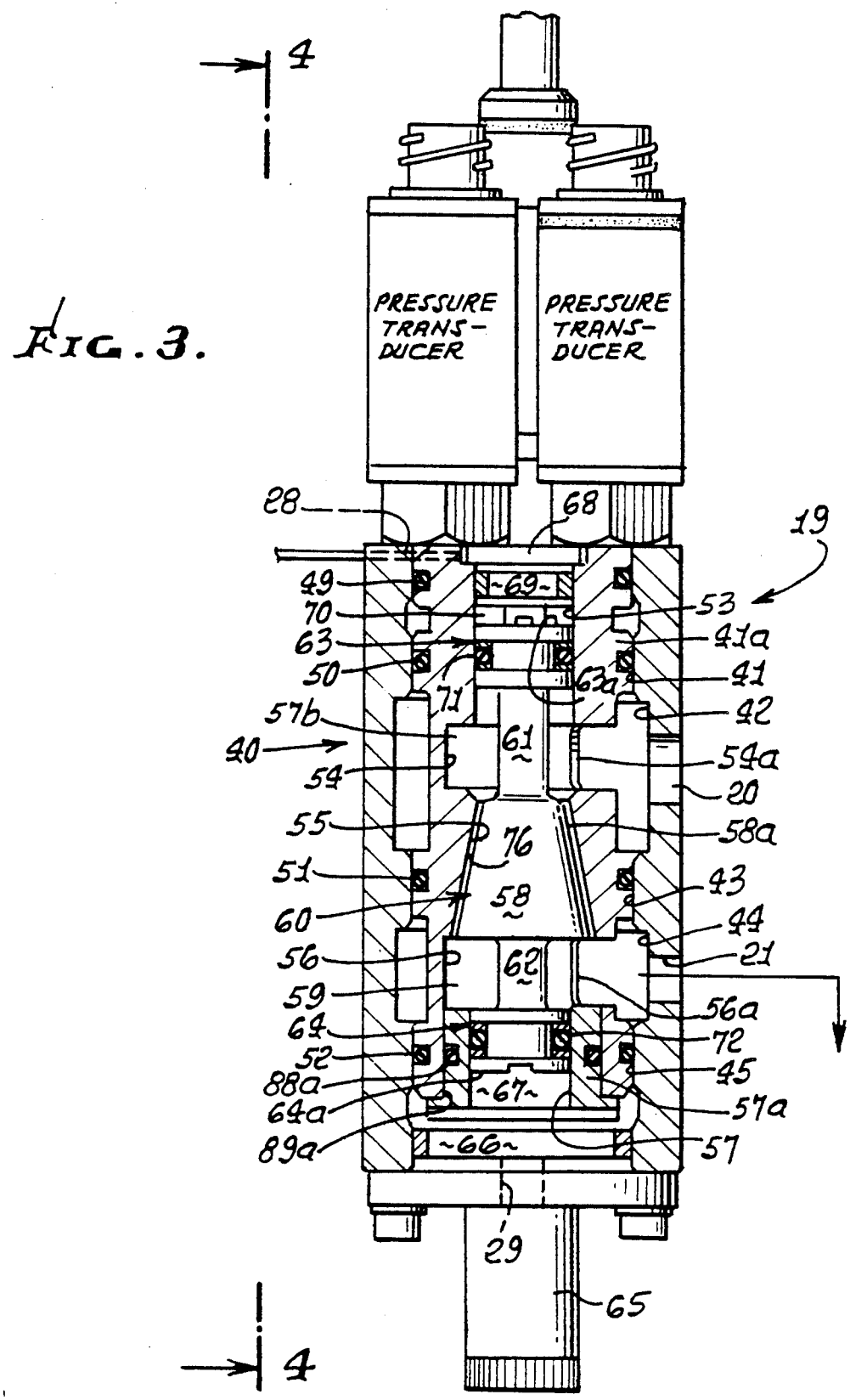
FIG. 3 is an enlarged vertical section taken through a modulating valve that modulates flow to the hydraulic motor.
Figure 4:
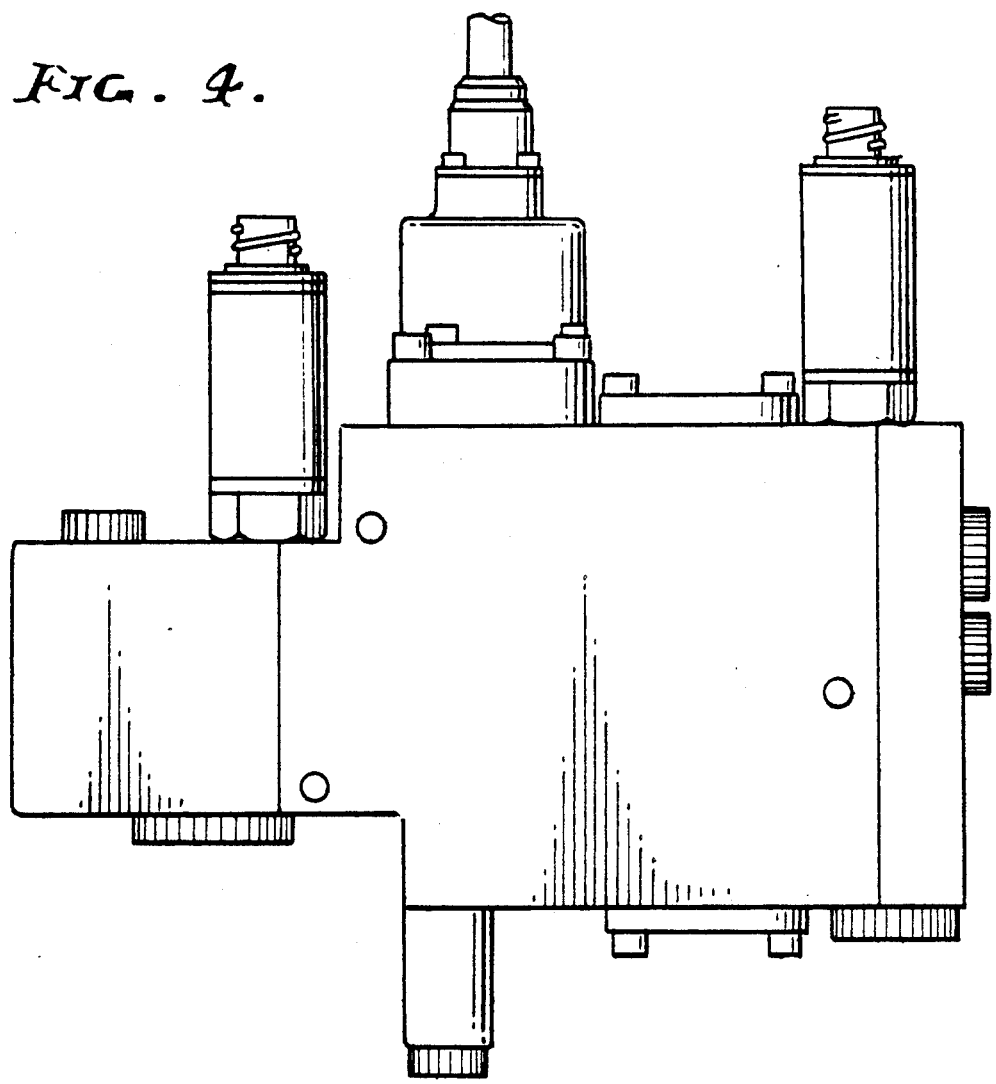
FIG. 4 is an exterior side elevation taken on lines 4—4 of FIG. 3.

The valve 19 comprises a tubular outer body 40 having bores 41, 43, 45, and counterbores 42 and 44, as shown. A tubular sleeve 41a is received in the bores, and retained axially at 46 by transducer assembly 47, and at 47 by structure 48 in the body. O-rings 49-52 seal off between the sleeve and bores. See FIG. 3.

The sleeve 41a defines, in sequence, bore 53, cylindrical counterbore 54, axially tapered counterbore 55, cylindrical counterbore 56, and bore 57 formed in sleeve insert 57a. Bore 54 is cut away locally at 54a to communicate with bore 42; and bore 56 is cut-away locally at 56a to communicate with bore 44. Hydraulic fluid passes via body intake port 20 to chamber 57b at one end of a tapered plug 58 in bore 55; and hydraulic fluid passes from chamber 57b via a gap between the plug surface 58a and the tapered bore 55, to chamber 59 at the opposite enlarged end of the plug, and then via cut-away 56a to bore 44 and through outlet port 21.

The plug is carried on a spool unit 60 that includes axial stems 61 and 62, and pistons 63 and 64. Control hydraulic fluid pressure passes via inlet port 29 via end fitting 65, to chambers 66 and 67 and is applied to the end face 64a of the piston 64. Similarly, control hydraulic fluid pressure passes via inlet port 28 to chambers 68, 69 and 70, for application against the end face 63a of piston 63. Note O-rings 71 and 72 carried by the pistons to seal off against axial bores 53 and 57. Then elastomeric O-rings position the piston in radially spaced relation from the cylinder walls to prevent metal-to-metal contact between the pistons and cylinder walls. An O-ring 88a is also carried by insert 57a to engage bore 87a of the sleeve.

In operation, the plug valve is movable axially in tapered bore 55 with its tapered surface 58a facing that bore, to increase or decrease an always maintained gap 76 formed between 58a and 55, for controlling the flow of hydraulic fluid to or from the motor. Thus, should fuel pressure drop, the plug valve is moved to increase the gap and allow more hydraulic fluid to pass to the hydraulic motor to drive the pump faster, and vice versa; however, the gap is always open, the motor is always driven by hydraulic fluid, and the pump is constantly rotating, i.e. operating. A stop 77 facing the end 63a of piston 63 "stops" its axial travel in a gap closing direction to prevent complete closure of the gap. Therefore, there is no metal-to-metal contact of valve plug and bore ports, and the valve is designed for controlled leakage; also, the valve is hydraulically stable. Suitable elastomeric O-ring back up rings (metallic) are also provided, as shown.

Figure 2:
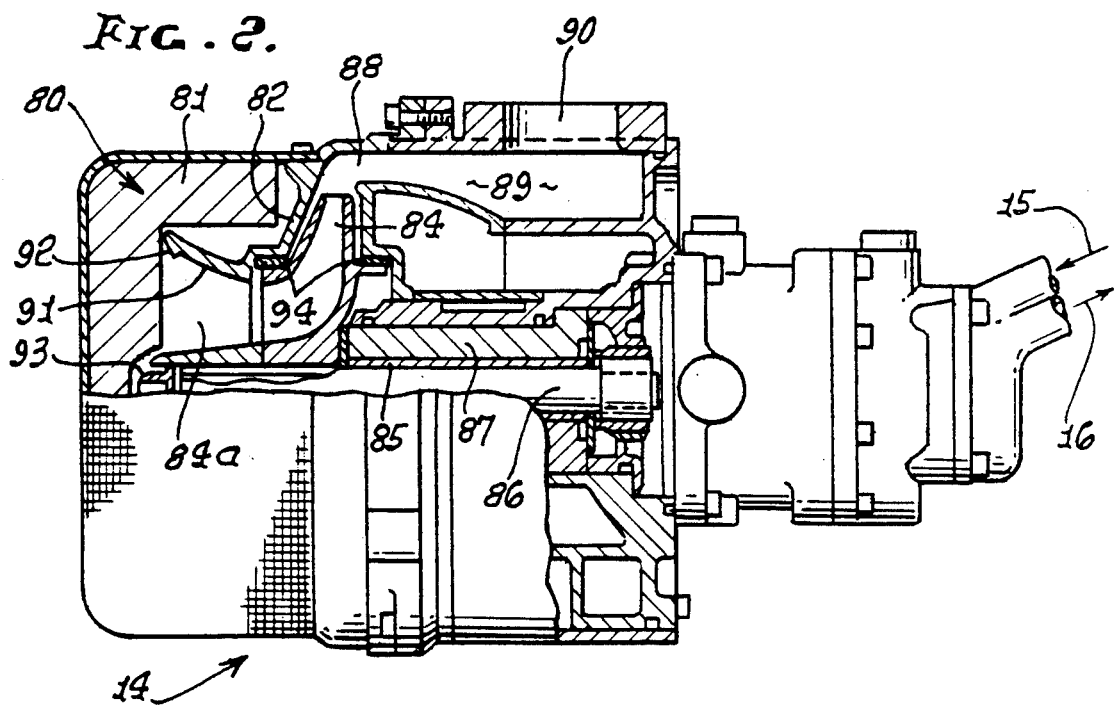
FIG. 2 is a vertical elevation, in section, showing fuel pump and pump driving hydraulic motor structure.

Referring to FIG. 2, the pump includes a body 80 having sections 81–82, as shown, An overlapping blade inducer 84a (of low blade angle) is mounted to section 81, immediately upstream of the pump impeller 84. This places the impeller lower into the fuel and permits use of a single or multiple sleeve bearing 85, to improve internal alignment, that bearing supporting the shaft 86 for rotation in pump sleeve 87. The impeller discharges into volute 88, communicating at 89 with outlet port 90.

The inducer is a 3-bladed structure having a suitable solidity with varying pitch to produce about six percent of the total head rise to the main stage. It is an overhung construction which provides smooth flow onto the following centrifugal impeller. It is fitted with an accelerating bell mouth 91 and back-flow deflector 92 to assist in pumping with very low submergence levels. An anti-swirl vane 93 is situated at the pump inlet to reduce rotation in the fluid surrounding the pump. The annular back-flow deflector is seen as the small hook on lip shape (in cross-section) at the pump inlet. Under low inlet pressure conditions, this device returns to the inlet the radial component of flow from the inducer that may escape along the bell mouth wall.

The blade sections of the impeller are tilted, and disposed as necessary around the axis of rotation. The leaving blade angle is about 20 degrees and the inlet blade edges are matched to the flow and the effect of the inducer. The impeller is fitted with carbon wear rings 94 sized to minimize the combination of leakage loss and viscous torque. The impeller itself is an investment casting, so that its greater reproducibility will minimize rotating wet imbalance.

The diffuser consists of two main and one independent sections. The swirling flow leaves the impeller and is delivered into eight pipe diffusers located around the periphery of the diffuser annulus. These diffusers reduce the swirl velocity and slow the flow at the same time to a velocity similar in magnitude to that leaving the exit or discharge flange.

Unlike typical vane diffusers which are used to turn the flow and thus recover swirl energy, the pipe diffuser is a simple, straight, rectangular passage with diverging walls that reduces the fluid velocity by gradually increasing the cross sectional area.

Figure 5:
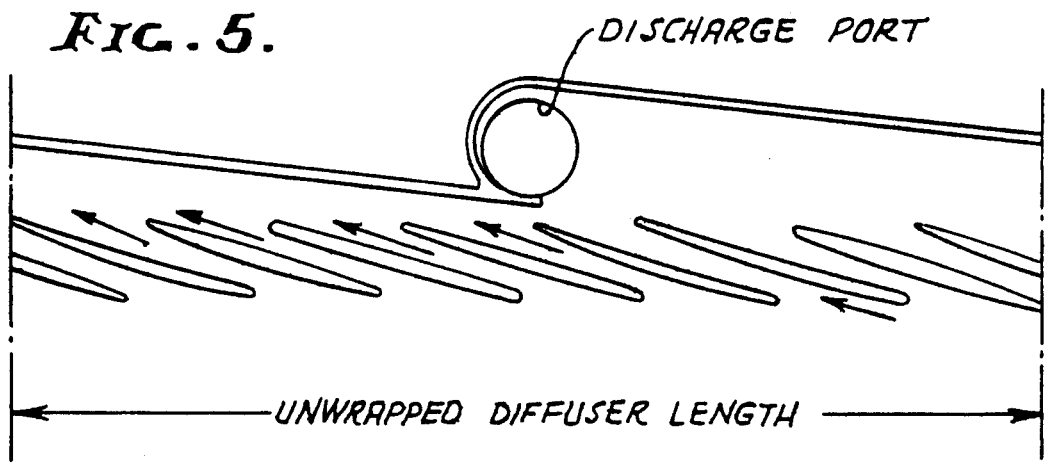
FIG. 5 is an enlarged section showing pump diffuser construction.

The pipe diffusers terminate well upstream of the exit flange itself. The flow leaving these diffusers is collected in an internal structure similar to a conventional centrifugal pump volute. Unlike a conventional pump, however, the discharge leaves radially on a centerline perpendicular to the shaft of the pump. To accomplish this turn, the internal volute structure is blended smoothly into a 90 degree bend to the radial direction. See FIG. 5. As referred to above, movement of the impeller deeper into the fuel permits better tailoring of the inducer to the impeller, lengthens the diffuser and reduces the overlap of the discharge port into the diffuser area. The mechanical advantage is that it provides additional length for the shaft bearing necessary to support the overhung inducer and impeller.

It can be seen in FIG. 2 that the resulting design is simple, rugged and highly producible. There are a total of six castings employed.

The diffuser housing constitutes the primary structural element. It consists of inner and outer flow channel walls connected by blades that are in reality the walls of the pipe diffuser. At its upper end is attached a casting which closes off the diffuser housing and to which the hydraulic motor is fastened. As shown in FIG. 2, this casting also forms the chamber of the volute and contains an integral bearing housing. The lower end of the casting is piloted in the diffuser housing to lend rigidity to the bearing support.

A carbon bearing structure, with single or multiple bearings, is supported in the housing by means of two O-rings. At its upper end the bearing is flanged and clamped in place by the seal housing. A single bearing structure is shown, in which the O-rings provide friction and clamping to eliminate the necessity of a shrink or press fit between the bearing and its housing and to relieve the rather brittle carbon bearing from shock loading.

Lubricant holes in the bearing and housing introduce pressure to the bearing close to its upper end to provide balancing pressurization to the primary thrust face. A FIG. 8 pattern of grooves on the bearing inside diameter assures a continuous flow of lubricant to all bearing surfaces including the thrust faces. These grooves also improve the bearings resistance to dry run damage and provides a path for contaminants to exit the bearing. If desired, such grooves can be omitted.

To ensure a positive flow of lubricant to the bearings, a path is maintained from the discharge pressure side of the pump to lower pressure areas at either the impeller inlet or the tank. The high pressure fluid is first filtered by a stainless steel sintered porous cylinder that surrounds the bearing housing. Then it progresses to the bearing and discharges at the top thrust bearing to tank pressure, or at the bottom thrust bearing to pump inlet pressure. The filter is generously proportioned for long life. The filtration level is 5 microns to minimize bearing wear due to contaminants. O-rings are used to seal the filter at either end.

The pump is pressure balanced to eliminate thrust loads on the bearings. A mild residual thrust will be retained to balance the weight of the shaft, inducer, impeller, and other attaching parts. Thrust from the spline coupling to the hydraulic motor can be as high as 295 pounds. The fact that splines can sustain/produce these forces is not generally appreciated but is not infrequently responsible for otherwise unexplainable thrust-bearing failures. Introduction of thrust by the splines is initiated by slight angular misalignment or axial loads from sources such as thermal or mechanical deflections. These are minimized in the proposed design by machining the bearing housing bore and pump aligning diameter on the same set up. A good boundary lubricant, such as a Molybdenum Disulfide grease, will be put on the splines prior to assembly.

Accordingly, the invention provides a low pressure drop two-stage valve that modulate pressurized hydraulic fluid like a lapped spool valve, but which eliminates need for expensive machinery, including lapping. It can be very easily manufactured, at low cost.

The valve is hydraulically stable, free from chatter, is characterized by low pressure drop, no metal-to-metal control, and by large clearance (about 0.0005 inches at full closure, i.e., with acceptable leakage), and freedom from stiction. Accordingly, a two-stage valve with low pressure drop (less than 100 psi at 3,000 psi) is provided.

I claim:

1. In a low pressure drop valve connectible to a source of pressurized hydraulic fluid for modulating hydraulic fluid flow, the improvement combination comprising:
   (a) valve body means defining an axially extending tapered bore and having hydraulic flow inlet and outlet ports,
   (b) a plug valve movable axially in that bore and having an externally tapered surface facing the tapered bore and movable axially relative thereto to increase or decrease a gap formed between the tapered surface and the tapered bore, for controlling the flow of hydraulic fluid via the gap and at least one of said ports,
   (c) means responsive to a side stream of pressurized hydraulic fluid to control axial movement of the plug valve in the tapered bore, said means including first and second pistons connected with the plug valve to move axially therewith, the valve body means forming first and second cylinders respectively receiving the pistons for application of hydraulic fluid pressure to the pistons for displacing the pistons and plug valve axially, and protective O-rings in the cylinders acting to space the pistons from bores formed by the cylinders,
   (d) and stop means in the valve body means to limit axial movement of the plug valve so as to prevent closing of said gap, said stop means spaced from said gap and from said pistons and O-rings.

2. The improvement of claim 1 wherein said O-rings are elastomeric and carried by the pistons.

3. The improvement of claim 1 wherein the first and second pistons are respectively located endwise axially oppositely of the tapered plug valve.

4. The improvement of claim 1 wherein the valve body includes one outer tubular body having bore means, and a sleeve in the body forming the tapered bore and receiving the plug valve and pistons.

5. The improvement of claim 4 wherein the sleeve is cut away at opposite ends of the tapered plug valve to communicate the gap with bores in the outer body, the bores communicating with said hydraulic flow inlet and outlet ports.

6. For use in a system that includes:
   (a) a liquid fuel pump,
   (b) an hydraulic motor drive for the pump,
   (c) a source of pressurized hydraulic fluid, and means operable to deliver and control delivery of said hydraulic fluid to the motor, the improvement to said means that includes an hydraulic fluid flow modulating valve comprising
   (d) valve body means defining an axially extending tapered bore and having hydraulic flow inlet and outlet ports,
   (e) a plug valve movable axially in said bore and having an externally tapered surface facing said tapered bore and movable axially relative thereto to increase or decrease a gap formed between said tapered surface and said tapered bore for controlling the flow of hydraulic fluid via said gap and at least one of said ports, to or from the motor,
   (f) means responsive to a side stream of said pressurized hydraulic fluid and to the sensed pressure of liquid fuel pumped by the pump to control axial movement of said plug valve in said tapered bore, thereby to control the flow of hydraulic fluid to said motor so as to drive the pump to maintain a substantially constant pressure of liquid fuel delivered by the pump,
   (g) and stop means spaced from said gap and located in the valve body means to limit axial movement of the plug valve so as to prevent closing of said gap.

7. The improvement of claim 6 wherein said means to control axial movement of the plug valve includes first and second pistons connected with the plug valve to move axially therewith, the valve body means forming first and second cylinders respectively receiving said pistons for application of hydraulic fluid pressure to the pistons for displacing the pistons and plug valve axially and protective O-rings in the cylinders acting to space the pistons from bores formed by the cylinders.

8. The improvement of claim 7 wherein said O-rings are elastomeric and carried by the pistons.

9. The improvement of claim 7 wherein the first and second pistons are respectively located endwise axially oppositely of the tapered plug valve.

10. The improvement of claim 6 including stop means in the valve body means to limit axial movement of the plug valve so as to prevent closing of said gap.

11. The improvement of claim 7 wherein the valve body includes one outer tubular body having bore means, and a sleeve in the body forming the tapered bore and receiving the plug valve and pistons.

12. The improvement of claim 11 wherein the sleeve is cut away at opposite ends of the tapered plug valve to communicate the gap with bores in the outer body, the bores communicating with said hydraulic flow inlet and outlet ports.

13. The improvement of claim 6 including said pump which is a centrifugal pump.

14. The improvement of claim 13 wherein said pump has an anti-swirl vane at the pump inlet to reduce swirl in the fluid flow surrounding the pump.

15. The improvement of claim 13 wherein the pump has a bell-shaped mouth and a back-flow deflector lip at said mouth.

16. The improvement of claim 13 wherein the pump includes diffuser sections one of which comprises pipe-shaped elements to reduce swirl velocity and slow the flow.

* * * * *